United States Patent Office 2,740,812
Patented Apr. 3, 1956

2,740,812

PREPARATION OF AMINO-ACIDS CONTAINING IMINO-GROUPS

Rudolf Lotz, Klingenberg (Main), Germany, assignor to Vereinigte Glanzstoff-Fabriken A. G., Wuppertal-Elberfeld, Germany No Drawing. Application April 16, 1953, Serial No. 349,313

Claims priority, application Germany April 22, 1952

2 Claims. (Cl. 260—534)

This invention relates to amino-acids, and more particularly to methods of preparing amino-acids containing imino-groups, and the compounds thus prepared.

It is an object of this invention to provide a method of preparing novel amino-acids containing in their chain two imino-groups separated from one another.

It is another object of this invention to provide novel amino-acids the chain of which contains two mutually separated imino-groups, and which lend themselves to a use as intermediate products, in the production of plastics, textile auxiliaries and softening agents.

Other objects, and the manner in which the same are attained, will become apparent as this specification proceeds.

The invention contemplates preparing amino-acids containing two imino-groups separated from one another in the chain and corresponding to the following general formula:

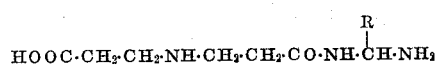

wherein R represents H, —CH₃, —Cl, —NH₂ or —C₆H₅.

The novel amino-acids according to the invention are prepared from a starting material consisting of cyclic compounds having the following constitution:

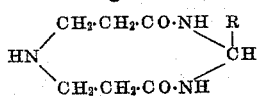

wherein R represents H, —CH₃, —Cl, —NH₂ or —C₆H₅.

The cyclic compounds forming the starting material for the method of this invention are obtained if in accordance with the process disclosed in my copending application for U. S. Letters Patent Serial No. 299,734, filed July 18, 1952, unilaterally aminated methylene-bis-chloropropionic acid amides of the formula

are forced to split off, quantitatively, HCl. In the course of this process, the cyclic compounds forming the starting material for the present invention and illustrated above by their formula, are obtained along with the polycondensation products of linear structure the preparation of which is the gist of the aforenoted copending application Serial No. 299,734.

Proceeding from the cyclic compounds forming the starting material for the present invention, the present method effects a ring cleavage attacking one of the CO·NH linkages, in order to arrive at the novel amino-acids containing two imino-groups aimed at by the invention.

It is recommended to effect this ring cleavage in an alkaline medium and preferably, within the pH-range of from about 8 to about 12 as otherwise, the reaction mechanism does not follow sufficiently clear lines.

Preferably, therefore, the method of the invention involves dissolving the cyclic starting compound e. g. in a diluted ammonia solution, heating the solution thus obtained with reflux, to a temperature from about 80° C. to about 100° C., recovering the sirupy reaction product and cleaning or purifying the same.

The novel amino-acids containing two imino-groups separated from one another, thus obtained are eminently useful as intermediates in the preparation of plastics, textile auxiliaries and softeners.

The method of preparing these novel amino-acids according to the invention, results in yields exceeding 80 per cent.

The invention will be more fully described by reference to the following specific examples. It should be understood, however, that the examples are given by way of illustration only and that the invention is not to be limited by the details set forth therein.

Example I 5 g. of the cyclic compound C₇H₁₃O₂N₃ corresponding to the structural formula

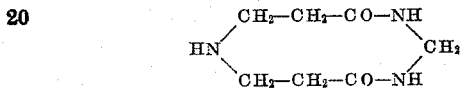

and having a melting point of 85° C., are dissolved in 50 g. of a 10 per cent ammonia solution and then heated with reflux to a temperature from about 80° C. to about 100° C., for about from 10 to 80 minutes. On cooling a sirupy mass is obtained which when stored in the vacuum desiccator for some time, solidifies and forms a solid mass. After cleaning or purification with acetone or ethanol, a novel amino-acid corresponding to the formula

and having a well defined melting point at 171° C., is obtained at a yield somewhat in excess of 80 per cent of the theoretical yield.

Example II

The method corresponds to that described with reference to Example I, except that as the starting material, the following substituted ring-compound is used:

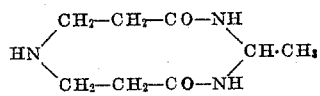

which has a melting point of 65° C. On completion of the treatment set forth with reference to Example I, the novel substituted amino-acid corresponding to the formula

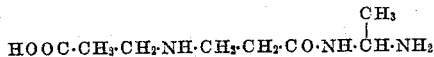

is obtained, at a yield of 80 per cent of the theoretical yield; this compound has a melting point of 128° C.

While I have disclosed the preferred embodiments of my invention, and the preferred modes of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:

1. The method of preparing amino-acids containing imino-groups, of the general formula

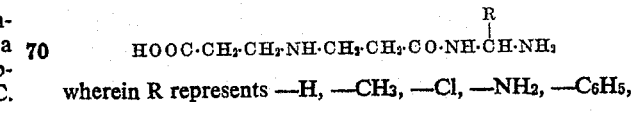

wherein R represents —H, —CH₃, —Cl, —NH₂, —C₆H₅, comprising heating cyclic compounds of the general formula

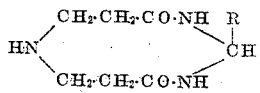

wherein R represents —H, —CH₃, —Cl, —NH₂, —C₆H₅ to a temperature from about 80° to about 100° C., in alkaline solution.

2. The method of preparing amino-acids containing imino-groups, of the general formula

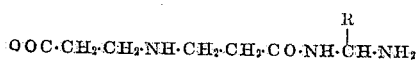

wherein R represents —H, —CH₃, —Cl, —NH₂, comprising heating cyclic compounds of the general formula

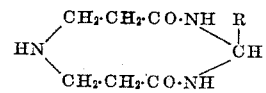

wherein R represents —H, —CH₃, —Cl, —NH₂, —C₆H₅ to a temperature from about 80° to about 100° C., in alkaline solution of a pH of from about 8 to about 12.

No references cited.